United States Patent [19]

Boocock et al.

[11] Patent Number: 5,112,918

[45] Date of Patent: May 12, 1992

[54] MOISTURE CROSS-LINKING OF POLYMERS

[75] Inventors: John R. B. Boocock; David A. Harbourne, both of Kingston, Canada

[73] Assignee: Du Pont Canada Inc., Mississauga, Canada

[21] Appl. No.: 575,036

[22] Filed: Aug. 30, 1990

[30] Foreign Application Priority Data

Sep. 4, 1989 [GB] United Kingdom ............... 8919895

[51] Int. Cl.$^5$ .............................................. C08L 27/10
[52] U.S. Cl. ................................ 525/209; 525/100; 525/288; 525/539; 264/211.24
[58] Field of Search ............... 525/100, 209, 288, 539; 264/211.24

[56] References Cited

U.S. PATENT DOCUMENTS 4,136,132  1/1979  Poole ................................. 260/827
4,753,993  6/1988  Keogh ................................ 525/100

FOREIGN PATENT DOCUMENTS 2187464  9/1987  United Kingdom .

Primary Examiner—Melvyn I. Marquis
Attorney, Agent, or Firm—Craig H. Evans

[57] ABSTRACT

A concentrate comprising a copolymer and 65 to 300%, by weight of the copolymer, of a vinyl silane is disclosed. The vinyl silane is vinyl trimethoxysilane and/or vinyl triethoxysilane. The copolymer is a copolymer of ethylene with at least one comonomer selected from the group consisting of carbon monoxide, vinyl acetate, alkyl acrylates and alkyl methacrylates, in which the alkyl groups have 1–4 carbon atoms. The copolymer is in a particulate form and has a heat of crystallization of less than 70 J/g, and if said copolymer is ethylene/vinyl acetate copolymer, then the copolymer has a vinyl acetate content of at least 18% by weight. The concentrate is maintained in a moisture-free environment and is in solid form. The concentrates are used in the moisture cross-linking of alpha-olefin polymers and offer versatility in processes for such cross-linking.

15 Claims, No Drawings

MOISTURE CROSS-LINKING OF POLYMERS

FIELD OF THE INVENTION

The present invention relates to a method for the moisture cross-linking of polymers, especially polyethylene, ethylene copolymers and other polyolefins, using vinyl silanes and in particular to concentrate compositions of vinyl silanes in certain copolymers of ethylene that may be used in the moisture cross-linking of polymers.

BACKGROUND OF THE INVENTION

Polymers are cross-linked in order to alter their properties, for instance to impart improvements in resistance to creep, environmental stress crack (ESCR) and abrasion, to improve dimensional stability at elevated temperature, and the like. As an example, it is known to rotationally mould compositions of polyethylene and organic peroxides, utilizing the flow characteristics of the polyethylene before cross-linking during the rotational moulding step and then cross-linking the polyethylene to provide an article that has acceptable end-use properties. Another example is the addition of cross-linking agents to polymers used in the manufacture of wire and cable to improve heat distortion temperature properties.

While most cross-linking agents tend to be organic peroxides, other cross-linking agents are known. For instance, it is known to graft vinyl silanes e.g. vinyl trimethoxysilane (VTMS) and vinyl triethoxysilane (VTES), onto polymers, form the polymers into a desired shape and then subject the resultant article to moisture, whereupon the silane residue forms cross-links between polymer chains. The grafting reaction of the vinyl silane onto the polymer is usually carried out in the presence of an organic peroxide, and the cross-linking reaction with moisture is usually carried out in the presence of a cross-linking catalyst.

In order to utilize the moisture cross-linking capability of VTMS (or related compounds) in the manufacture of cross-linked polymer articles, the VTMS may be directly copolymerized with ethylene in a high pressure polymerization process; an example of the resultant polymer is SI-LINK TM polymer obtainable from Union Carbide Corporation. In such polymers, the VTMS is incorporated into the main polymer chain, and the polymers are generally considered to be cross-linkable analogues of low density polyethylene that is made in similar high pressure processes.

If it is desired to have another type of cross-linkable polymer e.g. a high or medium density polyethylene or an ethylene copolymer, including a linear low density polyethylene, or where it is not convenient or practical for other reasons to obtain a direct copolymer, the silane must be grafted onto the polymer in melt processing apparatus. Articles may then be formed directly from the grafted polymer, or the grafted polymer may be subsequently processed into articles. In either method, it is necessary to contact VTMS with the polymer in the presence of a grafting catalyst in melt processing apparatus e.g. an extruder. If the grafted polymer is to be used in a subsequent process i.e. not formed directly into an article, the molten grafted composition passing from the melt processing apparatus must be collected in a moistureproof container e.g. bags or bulk storage device; contact with moisture results in cross-linking of the polymer, prior to formation of an article.

The melt processing characteristics of the grafted polymer and the extent of undesired premature cross-linking in the extruder are extremely sensitive to traces of moisture; it has been suggested that levels of moisture of less than 200 ppm be present in catalyst and pigments. The container used to store the grafted composition must have very good moisture barrier properties, and such containers tend to be expensive. Premature cross-linking (scorch) results from silane, catalyst and moisture being in contact at high temperature and causes pits and pimples in the product. Moreover, each different grade of grafted polymer would need to be prepared and stored separately by the end-user. In addition to the need to store the grafted composition in a moisture-free environment, the grafted polymer tends to have a limited storage life e.g. six months. Thus, compositions that have been grafted prior to manufacture of articles therefrom are susceptible to deterioration in melt flow and other desired properties.

In forming operations, it is often possible to carry out the grafting reaction in the extruder of the forming apparatus, prior to the forming of the polymer into a shaped article. However, the need to handle one or more liquid feed streams e.g. VTMS, grafting catalyst and cross-linking catalyst, adds both cost and complexity to the forming operation. Liquid storage facilities and pumping, metering and monitoring systems are required, as it is important to maintain a constant ratio of polymer to VTMS and other liquids, and to obtain a uniform dispersion of the VTMS and other liquids in the polymer. This is particularly expensive if cross-linkable product is only required from time to time; at other times the systems could be idle. Costs are also incurred because additional attention by process operators is required. Another disadvantage is that, since the grafting process involves mixing molten polymer and liquid, special extruder screw designs that are not otherwise essential to the forming operation may be required.

Masterbatch compositions comprising a substrate or carrier and a silane having a hydrolysable radical and a functional group that can undergo chemical reactions with amino, carboxyl and/or amide groups are disclosed in UK 2 187 464A of E. Schmid, published Sep. 9, 1987. It is disclosed that the carrier or substrate used, when is concentrate is formed by absorption, is a block copolymer with hard block and an elastomeric segment. The examples show that ethylene/vinyl acetate copolymers absorbed 10–20% by weight of silane.

SUMMARY OF THE INVENTION

It has now been found that concentrates of vinyl silanes in certain polymers may be formed, and that such concentrates may be used in the cross-linking of polymers.

Accordingly, the present invention provides a concentrate comprising: (a) at least one copolymer selected from the group consisting of copolymers of ethylene with at least one comonomer selected from the group consisting of carbon monoxide, vinyl acetate, alkyl acrylates and alkyl methacrylates, in which the alkyl groups have 1–4 carbon atoms, said copolymer being in a particulate form, and said copolymer (i) having a heat of crystallization of less than 70 J/g, and (ii) if said copolymer is ethylene/vinyl acetate copolymer, then the copolymer has a vinyl acetate content of at least 18% by weight; and (b) 65 to 300% by weight of the copolymer of at least one vinyl silane selected from the group consisting of vinyl trimethoxysilane and vinyl triethoxysilane; said copolymer not dissolving in the vinyl silane; and said concentrate being maintained in a moisture-free environment and being in solid form.

As used herein, "heat of crystallization" is determined by differential scanning calorimetry (DSC) as follows: a sample of polymer is heated at a rate of 20° C. per minute to a temperature above the melting point of the polymer, such temperature being at least 170° C. The polymer is then cooled at a rate of 10.C per minute to a temperature of 0° C. The heat of crystallization is calculated from the resultant plot of heat output versus time.

In a preferred embodiment of the concentrate of the present invention, the concentrate also contains a catalyst for the grafting of the vinyl silane onto a polymer.

In a further embodiment, the concentrate also contains a catalyst that promotes cross-linking in the presence of moisture.

The present invention further provides a process for the manufacture of a concentrate comprising the steps of: (a) contacting at least one copolymer selected from the group consisting of copolymers of ethylene with at least one comonomer selected from the group consisting of carbon monoxide, vinyl acetate, alkyl acrylates and alkyl methacrylates, in which the alkyl groups have 1–4 carbon atoms, said copolymer being in a particulate form, and said copolymer (i) having a heat of crystallization of less than 70 J/g, and (ii) if said copolymer is ethylene/vinyl acetate copolymer, then the copolymer has a vinyl acetate content of at least 18% by weight; with (b) at least one vinyl silane selected from the group consisting of vinyl trimethoxysilane and vinyl triethoxysilane;

(c) controlling the period of time of contact between the copolymer and vinyl silane to provide a concentration of vinyl silane in the copolymer that is 65 to 300% by weight of the copolymer, provided that said copolymer does not dissolve in the vinyl silane and said concentrate is in solid form; and (d) maintaining said concentrate in a moisture-free environment.

In addition, the present invention provides a process for the cross-linking of a polymer comprising the steps of:

(A) feeding to melt extrusion apparatus a polymer that is to be cross-linked, a vinyl silane concentrate and a catalyst for the grafting of the vinyl silane onto the polymer, said vinyl silane being in the form of a concentrate comprising:

(a) at least one copolymer selected from the group consisting of copolymers of ethylene with at least one comonomer selected from the group consisting of carbon monoxide, vinyl acetate, alkyl acrylates and alkyl methacrylates, in which the alkyl group has 1–4 carbon atoms, said copolymer being in a particulate form and said copolymer (i) having a heat of crystallization of less than 70 J/g, and (ii) if said copolymer is ethylene/vinyl acetate copolymer, then the copolymer has a vinyl acetate content of at least 18% by weight; and (b) 65 to 300% by weight of the copolymer of at least one vinyl silane selected from the group consisting of vinyl trimethoxysilane and vinyl triethoxysilane, said copolymer not dissolving in the vinyl silane, and said concentrate being maintained in a moisture-free environment and being in a solid form;

(B) admixing said polymer, concentrate and catalyst in the melt extrusion apparatus, and (C) extruding a composition of polymer grafted with vinyl silane.

In a preferred embodiment of the process of the present invention, a cross-linking catalyst is also fed to the extruder, especially in the concentrate.

In another embodiment, the extruded composition is cross-linked by contacting with moisture, especially moisture in the form of steam.

In a further embodiment, the extruded composition is immediately fed, without solidification, to further melt processing apparatus.

DESCRIPTION OF THE INVENTION

The present invention relates to a concentrate of a copolymer and a vinyl silane, and to the preparation and use of such concentrates. The copolymer is a copolymer of ethylene and at least one comonomer selected from carbon monoxide, vinyl acetate, alkyl acrylates and alkyl methacrylates, in which the alkyl group has 1–4 carbon atoms. In embodiments, the copolymer is characterized by having a heat of crystallization of less than 70 J/g. Moreover, if the copolymer is an ethylene/vinyl acetate copolymer, then the copolymer has a vinyl acetate content of at least 18% by weight. Examples of the copolymers are ethylene/vinyl acetate copolymers, ethylene/methyl acrylate copolymers, ethylene/ethyl acrylate copolymers, ethylene/butyl acrylate copolymers, ethylene/isobutyl acrylate copolymers, ethylene/vinyl acetate/carbon monoxide copolymers, ethylene/ethyl acrylate/carbon monoxide copolymers, ethylene/butyl acrylate/carbon monoxide copolymers, ethylene/ethyl methacrylate/carbon monoxide copolymers and ethylene/butyl methacrylate/carbon monoxide copolymers. Such copolymers are used in particulate form, for example in the form of pellets, granules, powder or the like. The molecular weight of the copolymer may be varied over a wide range, and may depend to some extent on the intended end-use for the concentrates. For instance, although the required mixing of the VTMS into the polymer to be grafted tends to be more readily accomplished by use of a concentrate, both the nature and molecular weight of the carrier polymer of the concentrate i.e. the copolymer defined above, should be chosen to achieve the necessary degree of speed and extent of dispersion of the vinyl silane and catalysts in the polymer to be grafted. If this is not done, poor admixing of the polymer and concentrate may be obtained, which would tend to result in non-uniformity in the cross-linking of the resultant admixed composition.

The copolymer has a heat of crystallization of less than 70 J/g, preferably less than 57 J/g and in particular less than 45 J/g. The concentrate is in the form of a solid i.e. the vinyl silane does not dissolve the copolymer.

The vinyl silane is a vinyl trialkoxysilane selected from the group consisting of vinyl trimethoxysilane and vinyl triethoxysilane. Such silanes are available commercially. Compositions containing vinyl silane, grafting catalyst and cross-linking catalyst are available as Silcat T R and Silcat T 17 from Union Carbide Corporation.

The vinyl silane and the copolymer of the concentrate are admixed in the required proportions. The concentrate may contain vinyl silane in amounts of 65 to 300% by weight of the copolymer, especially 170 to 300% by weight of the copolymer. If the concentration of vinyl silane is too low, the amount of concentrate needed to obtain a particular level of vinyl silane in the polymer to be cross-linked may be such that the properties of the polymer would be adversely affected by the presence of the carrier copolymer of the concentrate. While a high concentration of vinyl silane in the concentrate is desirable to reduce the cost of the formulation, there may be practical limits. To achieve high concentrations requires a low crystallinity polymer and such polymers exhibit a tendency to dissolve in the vinyl silane and/or cause the concentrate to be sticky and not free-flowing, in which event particulate blends of concentrate and polymer may not have acceptable flow properties.

The vinyl silane must be maintained in a moisture-free environment at all times prior to the desired time of cross-linking i.e. after extrusion of the composition of concentrate and polymer into an extruded product having vinyl silane grafted onto the polymer. In preparation of the concentrate, the vinyl silane, catalyst(s) and copolymer are admixed and maintained in contact for a period of time, which may be a few hours or several days, to permit the vinyl silane and catalyst(s) to be absorbed into the copolymer in a substantially uniform manner. The period of time will depend on the particular polymer of the concentrate, as well as the vinyl silane and the form and physical properties e.g. molecular weight, of the copolymer. The concentrate should be maintained at about ambient temperatures or less e.g. less than about 30° C. during the formation of the concentrate and during storage, transportation and the like prior to use, in order to minimize adverse temperature effects on the vinyl silane. The concentrate should be stored in moisture proof packaging, the cost of which would be lower than the cost of packaging the corresponding weight of grafted polymer prior to cross-linking.

The concentrate may be prepared by melt blending the vinyl silane, optionally containing catalysts, at a temperature below that at which degradation of the carrier polymer and catalysts will occur. However, preferably the concentrate is obtained by contacting the vinyl silane, optionally containing dissolved catalysts, with particles of the carrier polymer for a period of time sufficient for the liquid to be substantially absorbed. This may be done by mixing the desired quantity of vinyl silane, and any catalysts, with the polymer particles or the polymer may be immersed in excess vinyl silane and any catalyst and after a period of time recovered by removing excess liquid. In both methods, it is desirable to agitate the mixture of particles and liquid to facilitate absorption and obtain a more uniform composition. A solvent may be added to the vinyl silane. Use of excess liquid vinyl silane is less preferred because a considerable amount of liquid can weep from the particles and drain off before vinyl silane content in the particles has approached equilibrium. No matter how the liquid is incorporated in the particles, the surface of the particles may be wet with liquid.

It is to be understood that the concentrate as prepared may be dried e.g. by wiping the pellets. The nature of VTMS and VTES is such that a pellet blend of the necessary amount of concentrate and polymer to be cross-linked is usually free flowing, even if the surface of the polymer pellet is wet. Similarly, the concentrates themselves are also sufficiently free flowing to be poured and dispersed in base polymer even when wet.

In use, the vinyl silane is grafted onto the polymer with which the concentrate is admixed. In order to facilitate the subsequent cross-linking reaction with moisture, it is preferred to incorporate a cross-linking catalyst into the admixture of concentrate and polymer. This may be accomplished by separately admixing a cross-linking catalyst into the admixture, but preferably by incorporating the cross-linking catalyst into the concentrate; the latter tends to result in more uniform distribution of concentrate in the polymer. Examples of cross-linking catalysts are titanates and carboxylic acids salts of zinc, iron and tin e.g. zinc octoate, tin octoate and dibutyltin dilaurate. The amount of cross-linking catalyst used may be varied over a wide range as will be understood by those skilled in the art e.g. dibutyltin dilaurate may be used in amounts of at least 0.01% by weight of the polymer to be cross-linked, especially about 0.05%. Increasing the amount of cross-linking catalyst tends to increase the rate of cross-linking of the polymer but the quality of the molten polymer may be adversely affected.

The concentrate may be used by blending with the polymer to be cross-linked e.g. by physically blending the concentrate and polymer, or by separately feeding the concentrate and polymer to an extruder. The polymer to be cross-linked may be selected from a variety of polymers, including hydrocarbon polymers of $C_2$–$C_{10}$ alpha-olefins. Examples of such polymers include homopolymers of ethylene, and copolymers of ethylene with propylene, butene-1, 4-methyl pentene-1, hexene-1 and octene-1, vinyl acetate and alkyl acrylates, including terpolymers of ethylene, alpha-olefin and dienes. While homopolymers of propylene and of butene-1 may be used, such polymers are less preferred due to tendencies for substantial decrease in molecular weight in the presence of cross-linking catalysts; such a decrease may be desirable in some instances and/or compensated for in the selection of polymer. The polymers may in a form suitable for extrusion into films, sheets, rods, pipes and other products, injection moulding into containers or other articles, blow moulding into containers and the like, to form commercially-acceptable products, especially after the polymer has been cross-linked.

The concentrate and polymer are admixed under melt conditions to obtain a composition of acceptable uniformity. Such admixing should take place rapidly e.g. using adequate mixing elements, prior to any significant amount of grafting of vinyl silane onto the polymer, as the grafting reaction also takes place under polymer melt conditions. The amount of vinyl silane in the resultant admixture of concentrate and polymer may be varied over a wide range, but typically it is used in amounts of about 2% by weight of the polymer. It is preferred that a grafting catalyst be used e.g. an organic peroxide for example dicumyl peroxide, in amounts of, for example, 0.01–0.25% by weight of the polymer. The concentration of vinyl silane, the melt temperature and the residence time of the admixture under melt conditions are all believed to be important variables in the grafting reaction. The temperatures should be below the temperature at which the base polymer is significantly degraded. Liquid compositions of vinyl silane and grafting catalyst are available commercially e.g. the aforementioned Silcat T R vinyl silane composition.

The resultant grafted polymer is then extruded, injected or the like, depending on the process being used, to form the article or product. Subsequently, the article or product may be cross-linked by exposure to moisture, either by merely exposing to atmospheric conditions or by contacting with water, especially steam. Cross-linking may occur in a few hours in the presence of steam or over a period of a few days in the presence of atmospheric moisture, it being understood that the shape and thickness of the article or product is a factor in the cross-linking rate; the cross-linking reaction is believed to be controlled by the rate of diffusion of water into the polymer of the article or product, provided that a cross-linking catalyst is present in suitable proportions.

The concentrate and process of the invention may be used in the preparation of cross-linked products, eliminating the need to maintain and inject a moisture sensitive material viz. a vinyl silane, into melt processing apparatus. The preparation of the concentrate may be carried out on a relatively small amount of material and under controlled conditions that may not be available to operators of extrusion or moulding equipment, and with reduced risk of loss of large volumes of polymer in the event of contamination by moisture. The invention also provides versatility in the manufacture of a variety of cross-linked products.

Concentrates of modifying agents in carrier polymers and use with thermoplastic polymers are disclosed in the copending patent application of J.R.B. Boocock and D.A. Harbourne filed concurrently herewith.

The present invention is illustrated by the following examples.

EXAMPLE I

A concentrate was prepared by immersing pellets of ethylene/n-butyl acrylate (30% by weight)/carbon monoxide (10% by weight) copolymer having a melt index at 190° C. of 5 dg/min and a heat of crystallization of 33 J/g, in Silcat R vinyl silane composition. Excess liquid was drained from the concentrate; the resultant concentrate, which contained 66% of Silcat R composition, was stored in a moisture-proof container.

Blends of the vinyl silane concentrate were prepared with three polyethylenes of different density, each of which was also in pellet form. The blends were stored for a short period of time before use, in polyethylene bags that had been purged with nitrogen.

Each of the blends was injection moulded into plaques measuring approximately 13.3×10.8×0.25 cm on an Engel T injection moulding machine equipped with a screw intended for use in the injection moulding of polyethylene; the feed hopper was blanketed with nitrogen. The melt temperature was 228° C. The resultant plaques were immersed in boiling water for 8 hours and then stored in the water for a further 3 days.

The gel content of the resultant moulded plaques was then measured using the following procedure: Plaques obtained as described above were ground in a Wiley mill, using a coarse screen. Approximately one gram of the ground polymer was placed in a pouch made from fine mesh (200 mesh) copper screening. The pouch was placed in refluxing xylene, that was being purged with nitrogen, for period of three hours, the last 30 minutes of which the pouch was in contact with only xylene vapour. The material (gel) remaining in the pouch was then dried overnight in a convection oven. The gel content of the sample was (weight after xylene treatment)/(weight before xylene treatment), expressed as a percentage.

Further experimental details and the results obtained are given in Table I.

TABLE I

| Run No. | Polyethylene Type | Amount of Polyethylene (wt %) | Amount of Concentrate (%) | Gel Content |
| --- | --- | --- | --- | --- |
| 1 | A | 100 | 0 | 0 |
| 2 | A | 98 | 2 | 60 |
| 3 | A | 96 | 4 | 77 |
| 4 | B | 100 | 0 | 0 |
| 5 | B | 98 | 2 | 52 |
| 6 | B | 96 | 4 | 71 |
| 7 | C | 100 | 0 | 0 |
| 8 | C | 98 | 2 | 59 |
| 9 | C | 96 | 4 | 71 |

NB. Polyethylene A was an ethylene/butene-1 copolymer having a density of 0.924 g/cm$^3$ and a melt index of 5.1 dg/min;
Polyethylene B was an ethylene/butene-1 copolymer having a density of 0.950 g/cm$^3$ and a melt index of 14.5 dg/min;
Polyethylene C was an ethylene homopolymer having a density of 0.965 g/cm$^3$ and a melt index of 13.5 dg/min.

This example shows that highly cross-linked product, as indicated by the gel content, may be made with a concentrate of the invention, and from polyethylene of low, medium and high density.

EXAMPLE II

The procedure of Example I was repeated using Polyethylene C, at a melt temperature of 227° C., except that Type IV specimens as described in the procedure of ASTM D-638 were moulded. The moulded specimens were immersed in boiling water for a period of 8 hours, and then tensile strength measurements were conducted according to the procedure of ASTM D-638.

Further experimental details and the results obtained are given in Table II.

TABLE II

| Run No. | Amount of Polyethylene (wt %) | Amount of Concentrate (wt %) | Tensile Strength (MPa) |
| --- | --- | --- | --- |
| 10 | 100 | 0 | 24.8 |
| 11 | 99 | 1 | 27.4 |
| 12 | 98 | 2 | 32.2 |
| 13 | 96 | 4 | 38.2 |

This example shows that use of the concentrate results in a substantial increase in the tensile strength of the polymer.

EXAMPLE III

Blends of vinyl silane and ethylene/butene-1 copolymer having a density of 0.950 g/cm$^3$ and a melt index of 18 dg/min were prepared using concentrates of Silcat R vinyl silane in the ethylene/n-butyl acrylate/carbon monoxide copolymer of Example I. For blends having low concentrations of vinyl silane, the concentrate was prepared by immersion of powdered ethylene/n-butyl acrylate/carbon monoxide copolymer (instead of pellets) in vinyl silane for several days, in order to further ensure good distribution of the vinyl silane in the molten polymer subsequently obtained. The concentrate was in pellet form in the blends having higher concentrations of vinyl silane.

Blends of the ethylene/butene-1 copolymer and concentrate were stored under nitrogen in sealed polyethylene bags for a period of time before being subjected to an injection moulding process in an Engel injection moulding apparatus. The melt temperature used was 226° C. and the mould was a snake mould having a thickness of 1 mm; as is known in the art, snake flow moulds are used to predict whether or not the flow of polymer in an injection moulding die making commercial articles will be adequate. The moulded snake flow samples were immersed in boiling water for a period of 1.5 hours, and then the gel content was measured using the procedure described in Example I.

Further experimental details and the results obtained are given in Table III.

TABLE III

| Run No. | Amount of Concentrate (wt %) | Form Concentrate | Snake Flow (cm) | Gel Content (%) |
|---|---|---|---|---|
| 14 | 0 | — | 9.4 | 0 |
| 15 | 0.1 | powder | 9.25 | 0 |
| 16 | 0.2 | powder | 9.15 | 0 |
| 17 | 0.4 | powder | 9.0 | 0 |
| 18 | 0.8 | powder | 7.6 | 0 |
| 19 | 1.4 | powder | 6.6 | 34 |
| 20 | 2.0 | powder | 6.0 | 38 |
| 21 | 3.0 | pellets | 5.5 | 54 |
| 22 | 6.0 | pellets | 6.0 | 68 |

This example shows that the concentrate has relatively little effect on the snake flow of the polymer but provided the amount of concentrate is above a minimum value, injection moulded articles that are highly cross-linked can be obtained.

EXAMPLE IV

In order to illustrate the speed and extent of the uptake of cross-linking composition into the ethylene/n-butyl acrylate/carbon monoxide copolymer of Example I, 10 pellets of the copolymer were immersed in Silcat R composition in capped bottles. From time to time, the pellets were removed from the bottle, wiped dry, weighed and then returned to the bottle.

The results obtained are given in Table IV.

TABLE IV

| Run No. | Cumulative Time (hours) | Amount of Silcat R Absorbed (% of copolymer) |
|---|---|---|
| 23 | 0 | 0.0 |
| 24 | 0.08 | 9.4 |
| 25 | 0.17 | 12.7 |
| 26 | 0.33 | 24.1 |
| 27 | 1.00 | 36.7 |
| 28 | 1.92 | 64.1 |
| 29 | 2.87 | 81.2 |
| 30 | 5.28 | 115.9 |
| 31 | 22.01 | 170.6 |
| 32 | 29.29 | 171.4 |

This example illustrates that the uptake of vinyl silane into the copolymer is rapid, and that a high concentration of cross-linking liquid in the copolymer is obtained. Pellets containing greater than 60% by weight of Silcat R composition based on copolymer are obtainable in less than two hours.

To illustrate the amount of vinyl silane crosslinking composition which can be retained, the ethylene/n-butyl acrylate/carbon monoxide copolymer of Example I was immersed in Silcat R composition for a period of time that was greater than 60 hours. Portions weighing approximately 50 g were then weighed and placed in tightly stoppered bottles. At intervals, a bottle was opened, the pellets were dried on paper towels and the pellets weighed to determine weight loss. After 865 hours, the Silcat R composition concentration of the pellets had stabilized at about 185% by weight of the polymer.

EXAMPLE V

To illustrate the effect of polymer type on the formation of a concentrate of vinyl silane in polymer, pellets of a variety of polymers were immersed for a period of time in Silcat R composition and in vinyl triethoxysilane (VTES). The amount of liquid absorbed into the polymer was then determined from the increase in weight of the pellets.

Further experimental details and the results obtained are given in Table V.

TABLE V

| Run No. | Polymer | Vinyl Silane | Amount of Absorbed Liquid (%, polymer basis) | Adsorption Time (hours) |
|---|---|---|---|---|
| 33 | D | Silcat R | 103 | 234 |
| 34 | E | Silcat R | 112 | 504 |
| 35 | F | Silcat R | * | 287 |
| 36 | G | Silcat R | 244 | 234 |
| 37 | D | VTES | 89 | 234 |
| 38 | F | VTES | * | 287 |
| 39 | G | VTES | 168 | 234 |

*polymer dissolved in the vinyl silane
D ethylene/vinyl acetate (20.5%)/carbon monoxide (8%) copolymer, melt index 15 dg/min, heat of crystallization 67.5 J/g
E ethylene/vinyl acetate (23%)/carbon monoxide (11%), melt index 35 dg/min, heat of crystallization 43.6 J/g
F ethylene/vinyl acetate (40%) copolymer, melt index 48–66 dg/min, heat of crystallization 17.5 J/g
G ethylene/vinyl acetate (33%) copolymer, melt index 38–48 dg/min, heat of crystallization 36.9 J/g This example illustrates the use of concentrates prepared from Silcat R compositions and vinyl triethoxy silane. This Example also illustrates that some polymers will actually dissolve in vinyl silanes, and such polymers could only be used for concentrates containing lower levels of vinyl silane and carefully added to prevent the particles dissolving and/or fusing; Runs 35 and 38 are not of the invention.

EXAMPLE VI

This example illustrates the use of concentrates containing vinyl trimethoxysilane (VTMS) and vinyl triethoxysilane (VTES).

Concentrates were prepared with the following compositions: Concentrate H . . . . This concentrate was prepared from the ethylene/butyl acrylate/carbon monoxide copolymer of Example I, and a liquid composition containing 92% by weight of VTMS, 4% by weight of dicumyl peroxide and 4% by weight of dibutyltin dilaurate; and Concentrate J . . . . This concentrate was prepared from the ethylene/vinyl acetate polymer identified as G in Example V, and a liquid composition containing 92% by weight of VTES, 4% by weight of dicumyl peroxide and 4% by weight of dibutyltin dilaurate. Concentrate H exhibited a liquid up-take of 144% by weight of the copolymer, and Concentrate J had a liquid up-take of 86% by weight of the copolymer.

After 48 hours, each concentrate was blended with an ethylene/butene-1 copolymer having a density of 0.924 g/cm³ and a melt index of 5.1 dg/min. Each blend was then passed through a Welding Engineers twin screw extruder (2 cm), at the temperature indicated below, and extruded as a strand that was chopped. The resultant chopped strand was placed in boiling water for 8 hours and the gel content was then measured.

The results obtained were as follows:

| Run No. | Concentrate in Composition | Extrusion Melt Temp. (°C.) | Gel (%) |
|---|---|---|---|
| 40 | H (3%) | 221 | 71 |
| 41 | H (3%) | 193 | 66 |
| 42 | H (5%) | 188 | 74.5 |
| 43 | J (5%) | 189 | 73 |

This Example illustrates that both VTMS and VTES may be used to form cross-linkable compositions according to the invention.

We claim:

1. A concentrate comprising:
   (a) at least one copolymer selected from the group consisting of copolymers of ethylene with at least one comonomer selected from the group consisting of carbon monoxide, vinyl acetate, alkyl acrylates and alkyl methacrylates, in which the alkyl groups have 1-4 carbon atoms, said copolymer being in a particulate form, and said copolymer (i) having a heat of crystallization of less than 70 J/g, and (ii) if said copolymer is ethylene/vinyl acetate copolymer, then the copolymer has a vinyl acetate content of at least 18% by weight; and
   (b) 65 to 300% by weight of the copolymer of at least one vinyl silane selected from the group consisting of vinyl trimethoxysilane and vinyl triethoxysilane; said copolymer not dissolving in the vinyl silane; and said concentrate being maintained in a moisture-free environment and being in solid form.

2. The concentrate of claim 1 in which the concentrate also contains a catalyst for the grafting of the vinyl silanes onto a polymer.

3. The concentrate of claim 1 in which the concentrate also contains a cross-linking catalyst.

4. A concentrate of claim 1 that has 170-300% by weight of vinyl silane.

5. The concentrate of claim 1 in which the copolymer is other than ethylene/vinyl acetate.

6. The concentrate of claim 1 in which the copolymer is ethylene/vinyl acetate.

7. The concentrate of claim 5 in which the heat of crystallization is less than 57 J/g.

8. The concentrate of claim 5 in which the heat of crystallization is less than 45 J/g.

9. A process for the manufacture of a concentrate of claim 1 comprising the steps of:
   (a) contacting at least one copolymer selected from the group consisting of copolymers of ethylene with at least one comonomer selected from the group consisting of carbon monoxide, vinyl acetate, alkyl acrylates and alkyl methacrylates, in which the alkyl groups have 1-4 carbon atoms, said copolymer being in a particulate form, and said copolymer (i) having a heat of crystallization of less than 70 J/g, and (ii) if said copolymer is ethylene/vinyl acetate copolymer, then the copolymer has a vinyl acetate content of at least 18% by weight; with
   (b) at least one vinyl silane selected from the group consisting of vinyl trimethoxysilane and vinyl triethoxysilane;
   (c) controlling the period of time of contact between the copolymer and vinyl silane to provide a concentration of vinyl silane in the copolymer that is 65 to 300% by weight of the copolymer, provided that said copolymer does not dissolve in the vinyl silane and said concentrate is in solid form; and
   (d) maintaining said concentrate in a moisture-free environment.

10. The process of claim 9 in which the temperature is maintained at less than 30° C.

11. A process for the cross-linking of a polymer comprising the steps of:
   (A) feeding to melt extrusion apparatus a polymer that is to be cross-linked, a vinyl silane concentrate and a catalyst for the grafting of the vinyl silane onto the polymer, said vinyl silane being in the form of a concentrate of claim 1;
   (B) admixing said polymer, concentrate and catalyst in the melt extrusion apparatus, and;
   (C) extruding a composition of polymer grafted with vinyl silane.

12. The process of claim 11 in which a cross-linking catalyst is also fed to the extruder.

13. The process of claim 11 in which the cross-linking catalyst is contained in the concentrate.

14. The process of claim 11 in which the extruded composition is cross-linked by contacting with moisture.

15. The process of claim 11 in which the extruded composition is immediately fed, without solidification, to further melt processing apparatus.

* * * * *